June 16, 1953  G. J. EDMONDS  2,642,107
MACHINE FOR SKINNING VEGETABLES AND THE LIKE
Filed Dec. 20, 1949  3 Sheets-Sheet 1

WITNESSES
Thomas W. Kerr, Jr.
A. J. Brittingham.

INVENTOR:
Garfield J. Edmonds
BY Paul & Paul
ATTORNEYS.

June 16, 1953  G. J. EDMONDS  2,642,107
MACHINE FOR SKINNING VEGETABLES AND THE LIKE
Filed Dec. 20, 1949  3 Sheets-Sheet 2
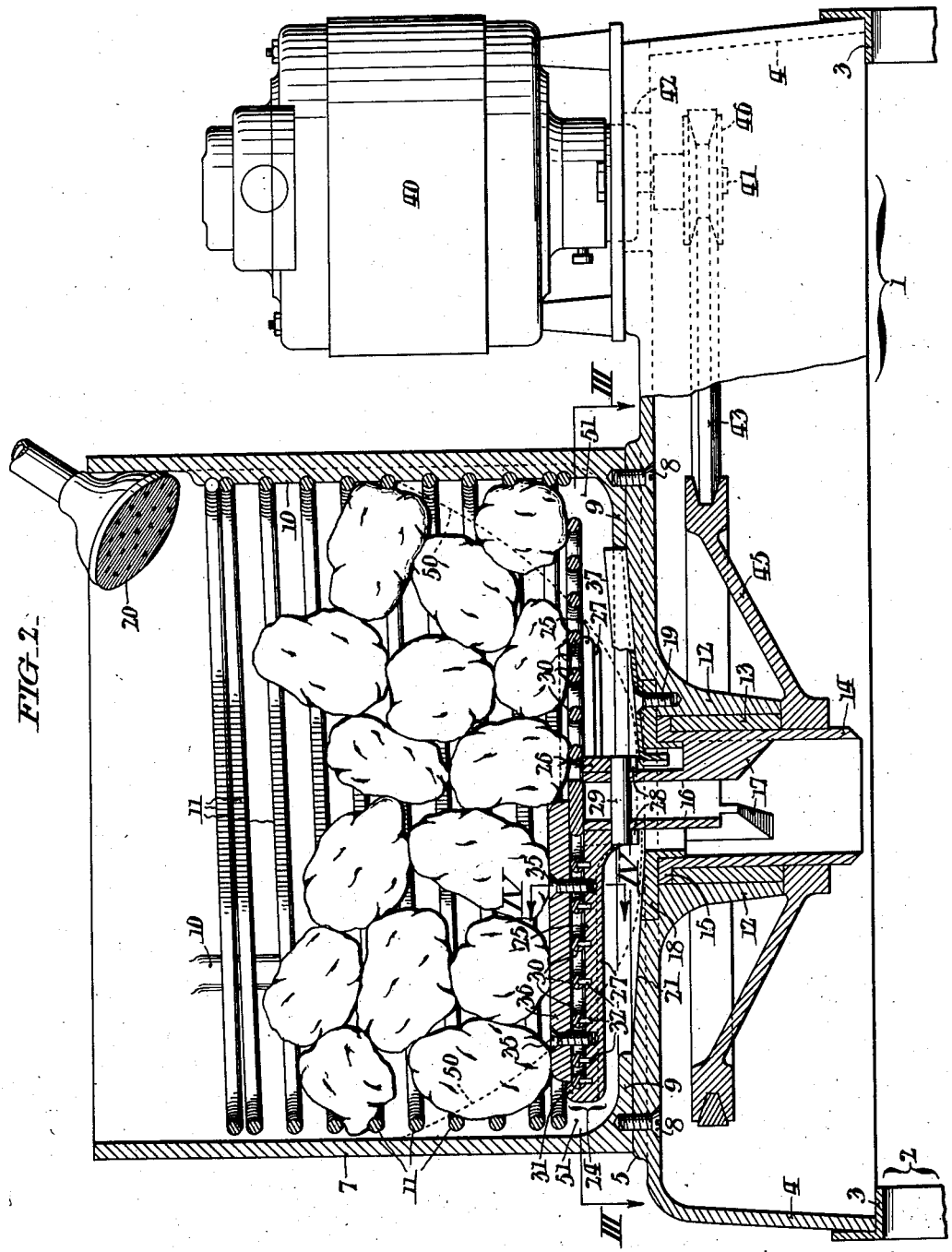
WITNESSES
Thomas W. Kerr, Jr.
A. J. Brittingham
INVENTOR:
Garfield J. Edmonds
BY Paul & Paul
ATTORNEYS.

June 16, 1953  G. J. EDMONDS  2,642,107
MACHINE FOR SKINNING VEGETABLES AND THE LIKE
Filed Dec. 20, 1949  3 Sheets-Sheet 3
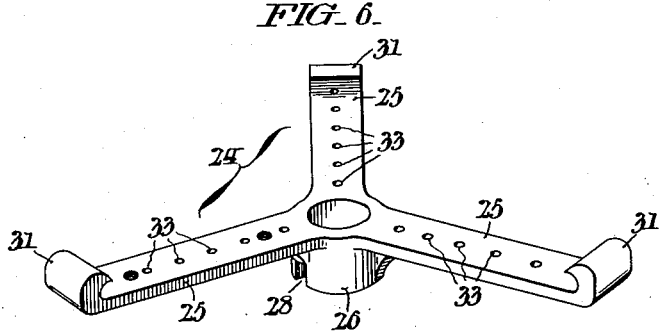
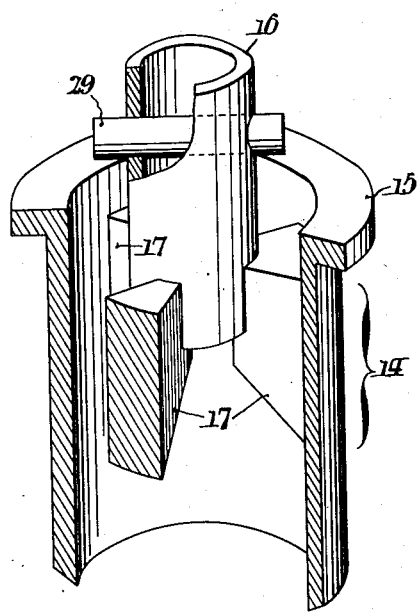
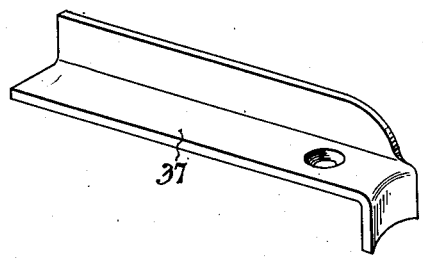
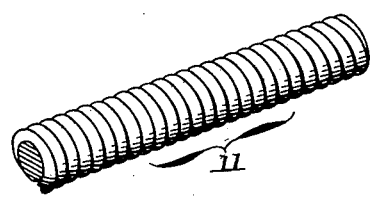
INVENTOR:
Garfield J. Edmonds
BY Paul & Paul
ATTORNEYS.

Patented June 16, 1953

2,642,107

UNITED STATES PATENT OFFICE 2,642,107

MACHINE FOR SKINNING VEGETABLES AND THE LIKE

Garfield J. Edmonds, Philadelphia, Pa.

Application December 20, 1949, Serial No. 134,013

4 Claims. (Cl. 146—50)

This invention relates to machines for skinning vegetables, fruits and other farm products, particularly potatoes.

The chief aim of my invention is to make it possible to remove the outer coverings from vegetables or fruits without deep cutting such as would result in the loss of a considerable amount of the flesh immediately beneath the skins. In other words, my invention is directed in the main, toward the provision of an automatic vegetable skinning machine which, although rapid in operation, is gentle in its treatment in that excessive penetration beyond the outer skin of the vegetables is avoided; which is of simple, compact and inexpensive construction; which requires but a small amount of power in operation; and which is self cleaning and therefore immune against clogging by accumulation of the removed skins.

More specifically stated this invention aims to provide a novel retainer means for concentric disposition within the treating container or shell of more or less conventional type peeling machines, said means comprising a continuously threaded rod that defines a cylindrical wall embodying spaced convolutions which provide a roughened surface effective to skin or peel the vegetables or fruit; in combination with a relatively rotatable flat-spiral end or bottom, of corresponding rod character, for said cylindrical wall.

Another aim of this invention is to provide an improved peeling machine having an axial drain outlet for the particles of skin removed from the vegetables, or fruit, during operation of said machine.

Other objects and attendant advantages will appear from the following detailed description of the attached drawings, wherein Fig. 1 shows my improved vegetable skinning machine in top plan.

Fig. 2 is a view partly in side elevation, and partly in longitudinal vertical section taken as indicated by the angled arrows II—II in Fig. 1, and drawn to a larger scale.

Figs. 5, 6, 7 and 8 are perspective views of various of the component parts of the machine to be specifically referred to later herein.

Figure 1:
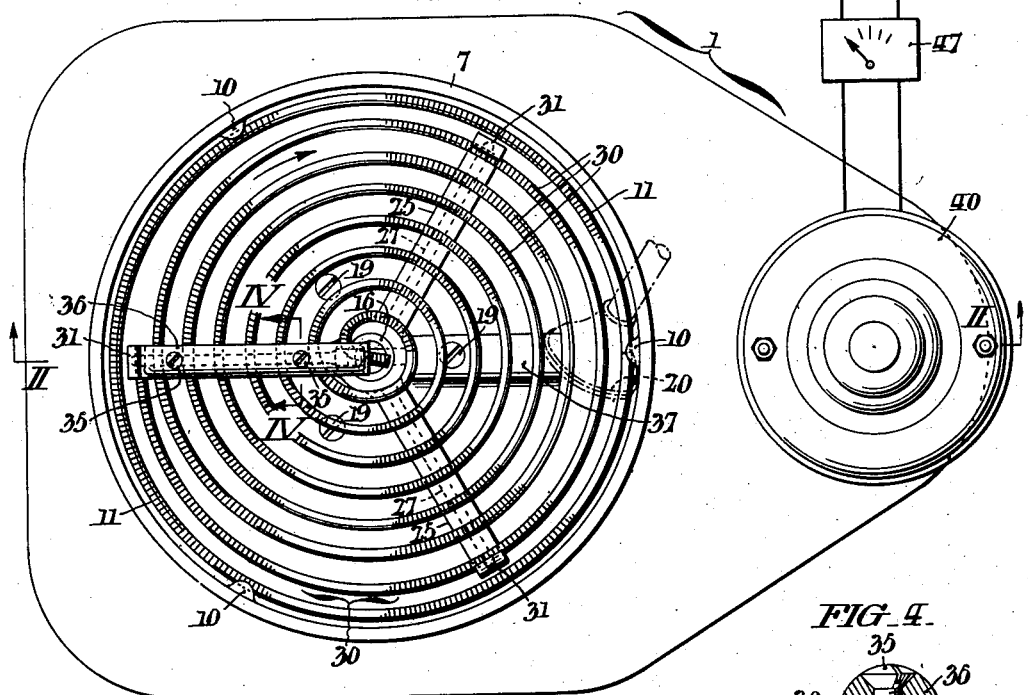

As herein exemplified, the machine has a hollow base 1 (Figs. 1 and 2) which may be supported upon an ordinary table, or upon a substructure or frame 2 with a top member 3 of angle structure or frame 2 with a top member 3 of angle structure or frame 2 with a top member 3 of angle section upon which the pendent perimetric apron flange 4 of said base 1 is rested. Adjacent one end, the upper web of base 1 is formed at the top with a slight circular rise 5, and mounted upon said rise in coaxial relation therewith, is a cylindric shell or treating container 7 which, in conjunction with the base top, constitutes a hopper for the vegetable or fruit wash-water. The shell 7 is fixed in position by means of headed screws 8 the shanks of which are passed upwardly through apertures in the top web of the base 1 and engage into an inwardly directed annular flange 9 at the bottom of said shell. It is to be noted that the top surface of the flange 9 is made to merge with the inner surface of the shell 7 through a curve of liberal radius to avoid a sharp corner at the region of juncture. At spaced points circumferentially, the shell or container 7 has inwardly-directed vertical ribs 10 which are semicircular in cross section and notched at intervals of their height for reception and retainment of a convoluted cylindrical retainer wall 11. As shown, the cylindrical wall 11 is fashioned from stout wire which is roughened as by threading, as conventionally indicated on the segment thereof illustrated in Fig. 8, for a purpose later on explained.

Pendent from the top web of the base 1 and centered relative to the rise 5, is a bearing boss 12 with a wear-resistant bushing 13 force fitted into it; and rotative within said boss is a hollow shaft element 14 that is separately illustrated in Fig. 5, and which has an outwardly projecting circumferential flange 15 at the top to bear upon the upper end of the sleeve 13, and a tubular upward axial projection 16 of smaller diameter integrated therewith by a plurality of radial ribs 17. The shaft element 14 is held in assembly by a retaining annulus 18 which is recessed into the top web of the base 1 and secured by screws 19. The hollow of the shaft element 14 serves as a drain outlet for the particles of the skin removed from the vegetables or fruit during the operation of the machine with the aid of wash water introduced under pressure into the shell or hopper 7, as also more fully explained later on, by means of the spray nozzle indicated at 20 in Figs. 1 and 2. Within the hopper, the top web of the base 1 and the top surface of the retaining annulus 18 are downwardly coned slightly as at 21 to facilitate drainage of the wash water toward the outlet hollow of the shaft element 14.

Figure 4:
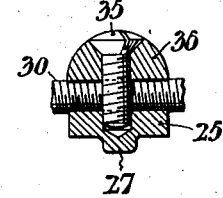
Fig. 4 is a detail section taken as indicated by the angled arrows IV—IV in Fig. 1.
Figure 3:
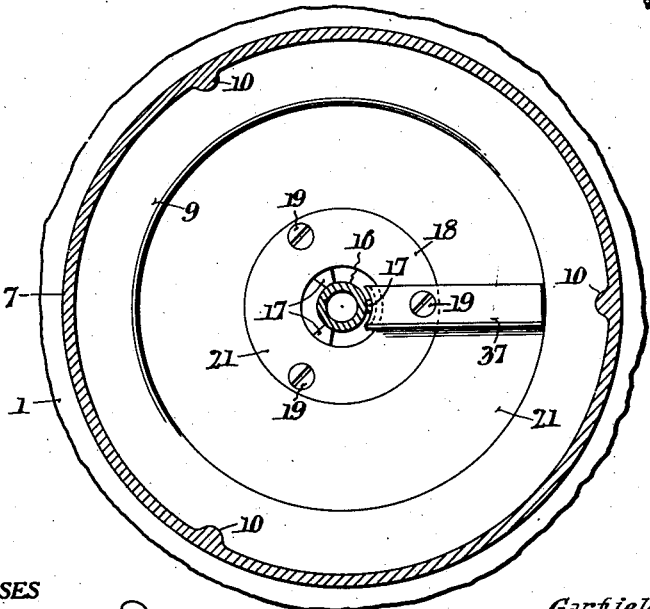
Fig. 3 is a horizontal section taken as indicated by the angled arrows III—III in Fig. 2.

Disposed centrally within the hopper or treating container 7 is a rotor in the form of a spider 24 with three arms 25 radiating from a central hub 26 which is bored to fit over the top end of the upward tubular projection 16 of the shaft element 14, said arms 25 having longitudinal ribs 27, see Figs. 2 and 4, centrally of their bottoms. The hub 26 of the spider 24 is notched at the bottom as at 28, Fig. 6, to engage the protruding ends of a diametrical pin 29, Figs. 2 and 5, fixed in the upward extension 16 of the shaft element 14. As a consequence of this construction, the spider 24 is drive-connected to the shaft element 14 and normally sustained at a level somewhat above the bottom of the hopper treating container, with capacity for upward removal from the latter. Supported by the spider 24 is a flat spiral 30 fashioned from stout threaded wire like that used for the cylindric retainer wall 11, said flat spiral being held in place by reason of having its outer convolution sprung into the hooked ends 31 of the spider arms 25, and its other convolutions maintained in definitely spaced relation by means of pendent stud projections 32, Fig. 2, engaged into pre-allocated socket holes 33, Fig. 6, in said arms 25. Overlaid upon the flat spiral 30 in line with one of the spider arms 25 and secured by a pair of screws 35, Figs. 1 and 2, is a half round section bar 36 which serves to keep the vegetables or fruit rolling and at the same time to urge them toward the retainer wall 11 during the operation of the machine.

For the purpose of agitating the wash-water incident to being swirled about in the hopper by the action of the ribs 27 on the arms 25 of the rotor or spider 24 and thereby maintain a shallow pool in the bottom of the hopper 7 during the operation of the machine, I have shown a baffle strip 37, Figs. 1 and 2, which is fashioned from sheet metal to angular cross section and secured substantially radially of the bottom of the hopper by one of the screws 19.

The means for driving the machine includes an electric motor 40 which is mounted on the end of the base 1 opposite to that occupied by the treating container 7, with its armature shaft 41 extending down through a clearance opening 42 in the top web of said base. Rotary motion is imparted to the rotor 24 at reduced speed by a V-belt 43 trained about a relatively large sheave 45 secured to the lower end of the shaft element 14 and a smaller sheave 46 similarly secured to the shaft 41 of the motor 40. In practice, the sheaves 45 and 46 used will be of such relative proportions as to determine a speed of approximately 190 revolutions per minute for the spider 24. Each operation of the machine may be timed by reference to a clock or a watch, or by an adjustable self-opening timing switch, such as is conventionally indicated at 47 in Fig. 1, interposed in the power leads 48 to the motor 40.

To prepare the machine for operation, the treating container 7 is filled with the vegetables, for example, potatoes, to about the level shown in Fig. 2, whereupon water is turned on for discharge from the nozzle 20 which is adjusted so that the spray is directed tangentially into the container 7 at a downward inclination in the direction of rotation of the spider 24 and to flat-spiral 30. With this preparation, the motor 40 is started to jointly drive the spider 24 and flat-spiral 30. By motion of the spider 24, the water is centrifuged in the treating container 7 and rises up the side of the latter as indicated by the broken line 50, Fig. 2, substantially to the top level of the vegetable mass, with maintenance of a shallow pool 51 thereof at the bottom of the container 7 through reaction between the pendent ribs 27 of the spider arms 25 and the baffle strip 37. The depth of the pool so maintained can be regulated by adjusting the position of the nozzle 20 and the discharge rate therefrom, and by adjusting the baffle 37 somewhat in one direction or the other from the true radial about the screw 19 by which it is secured. At the same time rolling movement is induced in the vegetables and the latter urged outward toward the wall of the container 7 by the action of the rounded radial bar 36 upon the bottom layer of the vegetables in the mass. It will thus be seen that the vegetables will constantly change their positions in the mass with presentation of changing portions of their surfaces gently to the exposed roughened surfaces of the retainer convoluted wall 11 and of the rotating flat-spiral 30, notwithstanding the relatively high speed at which the spider 24 is driven. During the skinning, the water has free access to the vegetables by reason of the clearances between the convolutions of the flat-spiral 30 and the cylindric retainer wall 11 and the spacing of the latter from the inside surface of the treating container 7 as shown in Fig. 2. As a consequence of this gentle action, the skin is completely scraped from the vegetables in from 45 to 60 seconds without appreciable removal of any of the meat immediately adjacent thereto, while the skin particles are carried off by the flow of wash-water constantly maintained during the treatment, leaving the scraped vegetables clean at the end of the prescribed run of the machine ready for slicing or other subsequent processing.

Having thus described my invention, I claim:

1. In a vegetable or fruit skinning machine including a treating receptacle having, at circumferential intervals of its interior surface vertical ribs, preferably of semicircular cross-section; the combination of a retainer cylinder, for the vegetables or fruit, concentrically journaled in the treating receptacle; said retainer cylinder, preferably, being in the form of a continuously convoluted wire to provide an open-wall cylinder with a flat spiral bottom for holding the vegetables or fruit during the skinning cycle, such cylinder being spacedly supported concentrically within the treating receptacle by engagement of its convolution within notches in the aforesaid ribs; and said convoluted open-wall cylinder, as well as the flat spiral bottom, being roughened as by threading to effect the skinning operation.

2. The invention of claim 1 further including means effective to rotate said flat-spiral relative to the retainer cylinder open-wall, and thereby impart constant rolling-motion to the vegetables or fruit during the skinning cycle of the machine.

3. The invention of claim 1 wherein the coiling of the convoluted wire cylinder is helical; and wherein the respective coils are spacedly-continuous with respect to each other.

4. The invention of claim 1 wherein the bottom of the treating receptacle is slightly coned downwardly and centrally equipped with a hollow shaft element, serviceable as a drain-outlet for the particles of skin removed, from the vegetables or fruit, during operation of the machine.

GARFIELD J. EDMONDS.

References Cited in the file of this patent

UNITED STATES PATENTS

| Number | Name | Date |
|---|---|---|
| 860,349 | Brenizer | July 16, 1907 |
| 889,161 | Weber | May 26, 1908 |
| 954,047 | Powell | Apr. 5, 1910 |
| 1,421,837 | Schaefer | July 4, 1922 |
| 1,766,999 | Johnston | June 24, 1930 |
| 1,926,705 | Urschel | Sept. 12, 1933 |
| 1,966,501 | Hoe | July 17, 1934 |
| 2,299,020 | Jones | Oct. 13, 1942 |
| 2,339,936 | McClung | Jan. 25, 1944 |
| 2,454,015 | Sheppard | Nov. 16, 1948 |

FOREIGN PATENTS

| Number | Country | Date |
|---|---|---|
| 267,104 | Germany | Nov. 8, 1913 |
| 547,137 | Germany | July 11, 1932 |